United States Patent
Fujishiro et al.

(10) Patent No.: US 10,154,433 B2
(45) Date of Patent: Dec. 11, 2018

(54) COMMUNICATION CONTROL METHOD

(71) Applicant: KYOCERA CORPORATION, Kyoto (JP)

(72) Inventors: Masato Fujishiro, Yokohama (JP); Yushi Nagasaka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 55 days.

(21) Appl. No.: 15/342,612

(22) Filed: Nov. 3, 2016

(65) Prior Publication Data

US 2017/0078914 A1    Mar. 16, 2017

Related U.S. Application Data

(63) Continuation of application No. PCT/JP2015/063239, filed on May 7, 2015.

(30) Foreign Application Priority Data

May 8, 2014  (JP) ................................ 2014-097178

(51) Int. Cl.
| | | |
|---|---|---|
| *H04W 28/04* | (2009.01) | |
| *H04W 36/02* | (2009.01) | |
| *H04W 48/18* | (2009.01) | |
| *H04W 88/06* | (2009.01) | |

(52) U.S. Cl.
CPC ........... *H04W 28/04* (2013.01); *H04W 36/02* (2013.01); *H04W 48/18* (2013.01); *H04W 88/06* (2013.01)

(58) Field of Classification Search
CPC ..... H04W 88/06; H04W 12/02; H04W 36/02; H04W 76/16
See application file for complete search history.

(56) References Cited

U.S. PATENT DOCUMENTS

| | | |
|---|---|---|
| 2010/0002650 A1 | 1/2010 | Ahluwalia |
| 2013/0329694 A1 | 12/2013 | Vrzic et al. |
| 2014/0043979 A1* | 2/2014 | Etemad .................. H04W 4/70 370/237 |
| 2014/0079007 A1 | 3/2014 | Li et al. |

FOREIGN PATENT DOCUMENTS

| | | |
|---|---|---|
| EP | 3122146 A1 | 1/2017 |
| JP | 2010-502037 A | 1/2010 |
| JP | 2011-61364 A | 3/2011 |

(Continued)

OTHER PUBLICATIONS

International Search Report issued in PCT/JP2015/063239; dated Jul. 28, 2015.

(Continued)

*Primary Examiner* — Chandrahas B Patel
(74) *Attorney, Agent, or Firm* — Studebaker & Brackett PC

(57) ABSTRACT

A communication control method according to an embodiment is a communication control method for controlling communication of a user terminal. The communication control method comprises: transmitting, by a cellular base station, data of a predetermined layer, via a WLAN access point to the user terminal; and transmitting, by the user terminal, delivery acknowledgement information based on the received data, via the WLAN access point to the cellular base station.

6 Claims, 11 Drawing Sheets

(56) References Cited

FOREIGN PATENT DOCUMENTS

| WO | 2012/163260 A1 | 12/2012 |
| WO | 2013/086410 A2 | 6/2013 |

OTHER PUBLICATIONS

Written Opinion issued in PCT/JP2015/063239; dated Jul. 28, 2015.

3rd Generation Partnership Project; Technical Specification Group Radio Access Network; Study on Wireless Local Area Network (WLAN)—3GPP radio interworking; 3GPP TR 37.834 V12.0.0; Dec. 2013; pp. 1-17; Release 12; 3GPP Organizational Partners.

3rd Generation Partnership Project; Technical Specification Group Radio Access Network; Study on Small Cell enhancements for E-UTRA and E-UTRAN; Higher layer aspects; 3GPP TR 36.842 V12.0.0; Dec. 2013; pp. 1-71; Release 12; 3GPP Organizational Partners.

The extended European search report issued by the European Patent Office dated Nov. 24, 2017, which corresponds to European Patent Application No. 15788785.2-1854 and is related to U.S. Appl. No. 15/342,612.

Broadcom Corporation; SCG handover for Dual Connectivity; 3GPP TSG-RAN WG2 Meeting #85; R2-140424; Feb. 10-14, 2014; pp. 1-6; Prague, Czech Republic.

"PDCP reordering for option 3C in dual connectivity", 3GPP TSG RAN WG2 Meeting #85; R2-140269; Prague, Czech Republic, Feb. 10-14, 2014; 4pp.

An Office Action issued by the Japanese Patent Office dated Mar. 6, 2018, which corresponds to Japanese Patent Application No. 2017-211728 and is related to U.S. Appl. No. 15/342,612; with English language concise explanation.

\* cited by examiner

COMMUNICATION CONTROL METHOD

FIELD

The present disclosure relates to a communication control method in a communication system having a cellular base station and a WLAN access point.

BACKGROUND

In recent years, the use of a user terminal having both functions of cellular communication and wireless LAN (WLAN: Wireless Local Area Network) communication is increasingly becoming popular. Further, the number of WLAN access points managed by an operator of a cellular communication network increases. Therefore, in 3GPP (3rd Generation Partnership Project), a technology is being considered which is capable of strengthening cooperation (inter-working) between a cellular RAN (Radio Access Network) and a WLAN (see Non Patent Literature 1).

On the other hand, an architecture of Dual Connectivity is being considered where an MeNB (Master eNodeB) that is a cellular base station configured to process data of a plurality of bearers passes the data of some bearers through an SeNB (Secondary eNodeB) that is another cellular base station (see Non Patent Literature 2).

CITATION LIST

Non-Patent Literature

[NPL 1] 3GPP Technical Report "TR 37.834 V12.0.0" December, 2013
[NPL 2] 3GPP Technical Report "TR 36.842 V12.0.0" January, 2014

SUMMARY

A communication control method according to a first aspect is a communication control method for controlling communication of a user terminal, and comprises: transmitting, by a cellular base station, data of a predetermined layer, via a WLAN access point to the user terminal; and transmitting, by the user terminal, delivery acknowledgement information based on the received data, via the WLAN access point to the cellular base station.

A communication control method according to a second aspect is a communication control method for controlling communication of a user terminal, and comprises: transmitting, by the user terminal, to a first cellular base station, a delivery status report indicating a delivery status of data received from the first cellular base station, if the user terminal performs a handover from the first cellular base station to a second cellular base station.

A communication control method according to a third aspect is a communication control method for controlling communication of a user terminal, and comprises: transmitting, by a first cellular base station, a delivery status report indicating a delivery status of data transmitted from the user terminal, to the user terminal, if the user terminal performs a handover from the first cellular base station to a second cellular base station.

DESCRIPTION OF EMBODIMENTS

Figure 1:
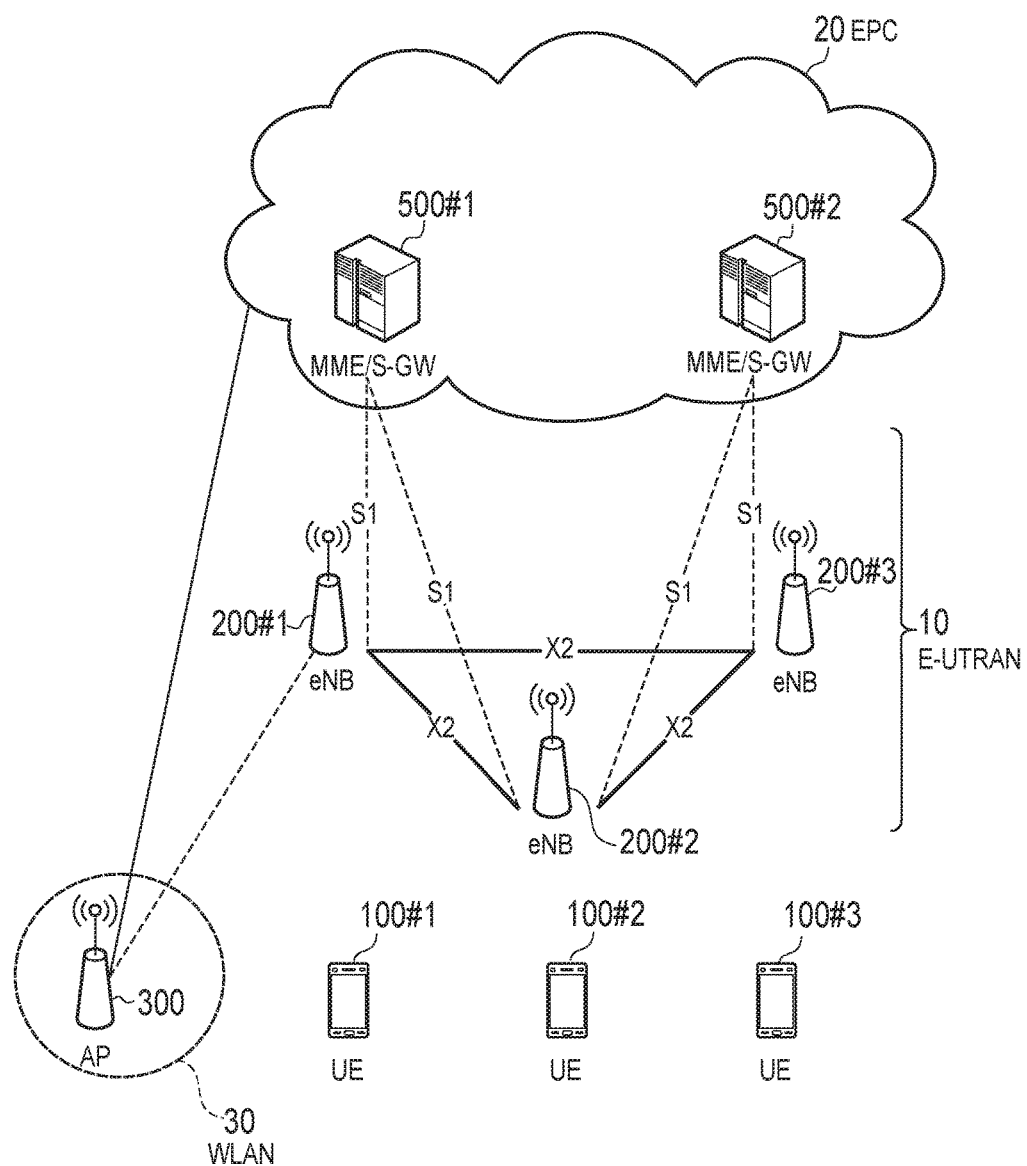
FIG. 1 is a diagram showing a communication system according to a first embodiment.

Below, with reference to the drawing, an embodiment (hereinafter, "the present embodiment") will be described in which an LTE system that is a cellular communication system based on the 3GPP standards is linked with a wireless LAN (WLAN) system. The present embodiment is divided into first to third embodiments, and each embodiment will be described.

First Embodiment

FIG. 1 is a diagram indicating a communication system in the first embodiment. As shown in FIG. 1, the communication system includes a plurality of UEs (User Equipments) 100, E-UTRAN (Evolved-UMTS Terrestrial Radio Access Network) 10, and EPC (Evolved Packet Core) 20.

The E-UTRAN 10 corresponds to a cellular RAN. The EPC 20 corresponds to a core network. The E-UTRAN 10 and the EPC 20 constitute a network of the LTE system.

The UE 100 is a mobile radio communication device, and corresponds to the user terminal. The UE 100 is a terminal (dual terminal) that supports both cellular communication scheme and WLAN communication scheme.

The E-UTRAN 10 has a plurality of eNBs 200 (evolved Node-Bs). The eNB 200 corresponds to a cellular base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for instance, has a radio resource management (RRM) function, a routing function of user data, and a measurement control function for mobility control and scheduling.

The eNBs 200 are connected mutually via an X2 interface. Further, the eNB 200 is connected to MME (Mobility Management Entity)/S-GW (Serving-Gateway) 500 included in the EPC 20 via an S1 interface.

The EPC 20 has a plurality of MMEs/S-GWs 500. The MME is a network node for performing various mobility controls, etc., for the UE 100 and corresponds to a controller. The S-GW is a network node that performs transfer control of user data and corresponds to a mobile switching center.

The WLAN 30 has WLAN access point (hereinafter, called "AP") 300. The AP 300 is, for example, an AP (Operator controlled AP) controlled by an operator of the LTE network.

The WLAN 30 is configured to be in compliance with some IEEE 802.11 standards, for example. The AP 300 communicates with the UE 100 in a frequency band (WLAN frequency band) different from a cellular frequency band. The AP 300 is connected to the EPC 20 via a router, etc.

Further, it is not limited to the case where the eNB 200 and the AP 300 are separately disposed. The eNB 200 and the AP 300 may be disposed in the same place (Collocated). Alternatively, the eNB 200 and the AP 300 are directly connected by arbitrary interface of an operator. Details of an interface between the eNB 200 and the AP 300 will be described later.

Subsequently, a configuration of the UE 100, the eNB 200, and the AP 300 will be described.

Figure 2:
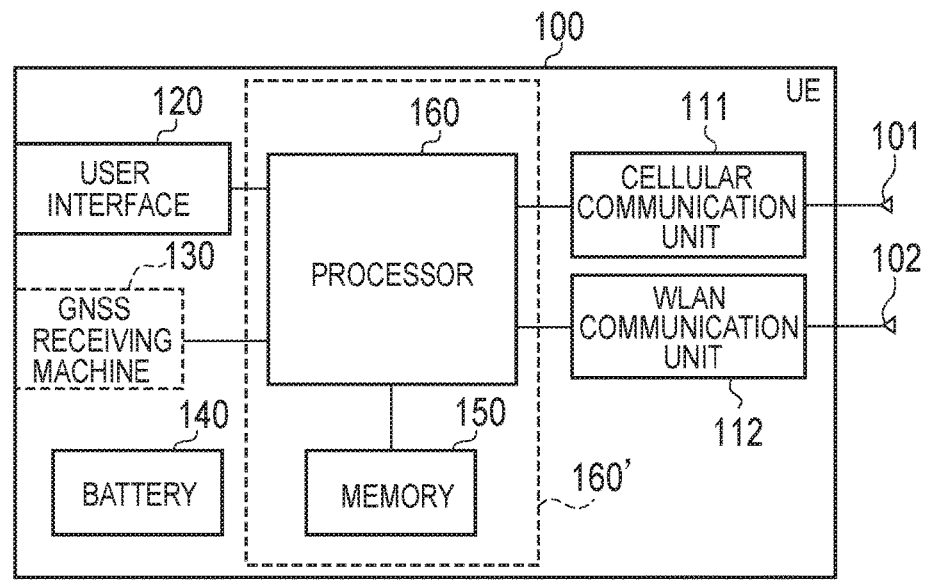
FIG. 2 is a block diagram of a UE according to the first embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 configure a controller. The UE 100 may not have the GNSS receiver 130. Furthermore, the memory 150 may be integrally formed with the processor 160, and this set (that is, a chipset) may be called a processor 160'.

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and has, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 has the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
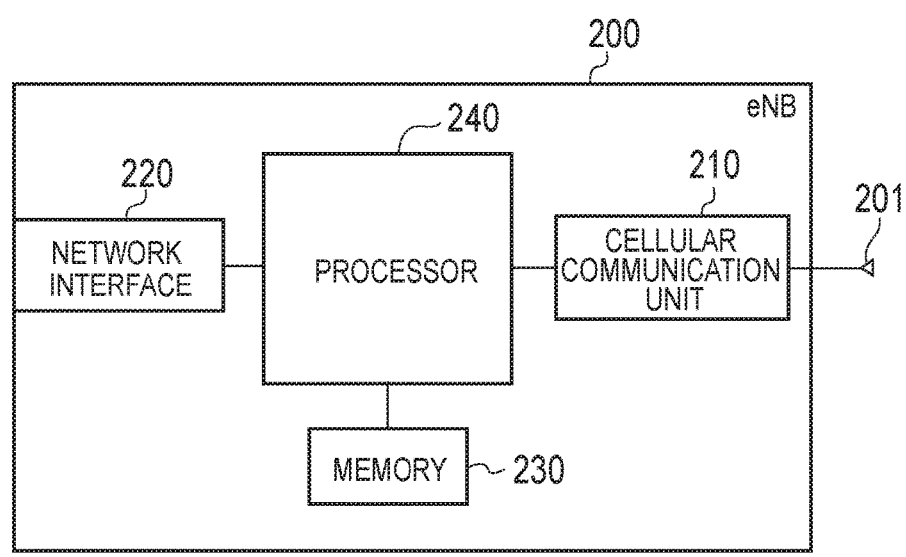
FIG. 3 is a block diagram of an eNB according to the first embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a controller. Furthermore, the memory 230 may be integrally formed with the processor 240, and this set (that is, a chipset) may be called a processor.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to a backhaul network (backhaul NW).

The memory 230 stores a program to be executed by the processor 240 and information to be used for a process by the processor 240. The processor 240 has the baseband processor that performs modulation and demodulation, encoding and decoding and the like on the baseband signal and a CPU that performs various processes by executing the program stored in the memory 230. The processor 240 implements various processes and various communication protocols described later.

Figure 4:
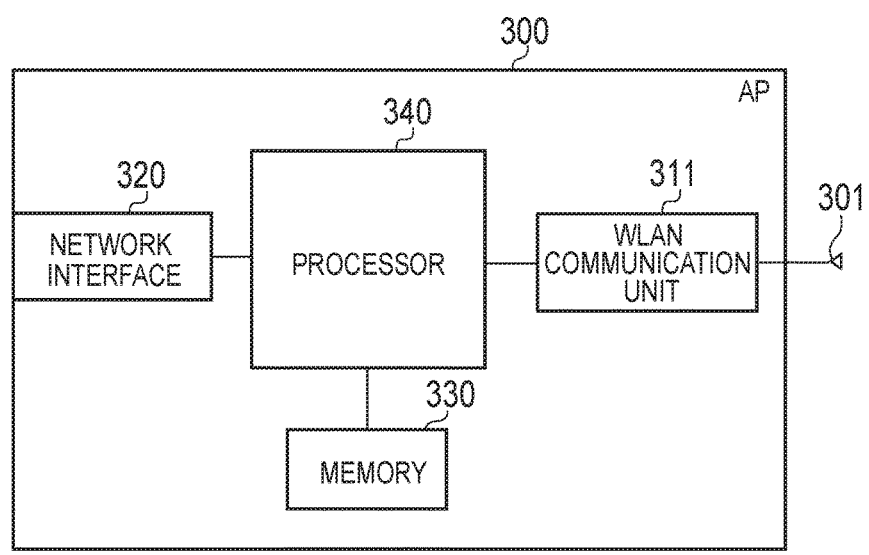
FIG. 4 is a block diagram of an AP according to the first embodiment.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to the backhaul network (backhaul NW).

The memory 330 stores a program executed by the processor 340 and information used for a process by the processor 340. The processor 340 has the baseband processor that performs modulation and demodulation, and encoding and decoding on the baseband signal and a CPU that performs various processes by executing the program stored in the memory 330. The processor 340 performs various processes described later.

Figure 5:
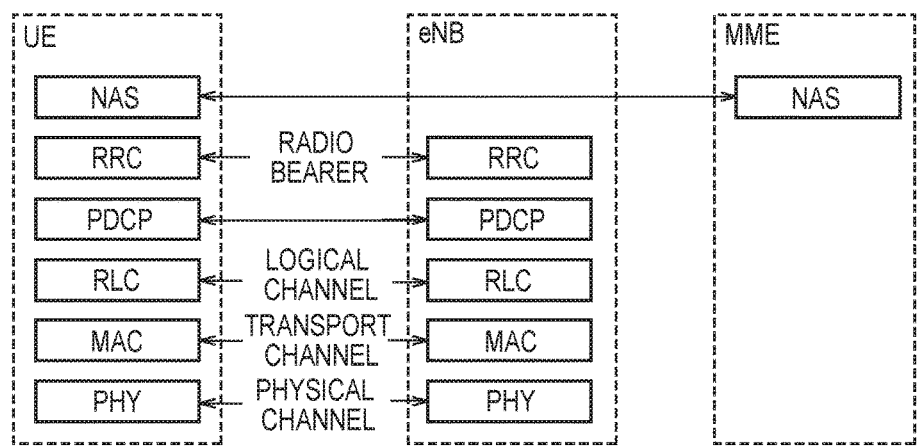
FIG. 5 is a protocol stack diagram of an LTE radio interface according to the first embodiment.

FIG. 5 is a protocol stack diagram of a LTE radio interface. As shown in FIG. 5, the radio interface protocol is classified into a first layer to a third layer of an OSI reference model, wherein the first layer is a physical (PHY) layer. The second layer has a MAC (Media Access Control) layer, an RLC (Radio Link Control) layer, and a PDCP (Packet Data Convergence Protocol) layer. The third layer has an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 has a scheduler for deciding a transport format (a transport block size, a modulation and coding scheme) of an uplink and a downlink, and an assigned resource block to the UE 100.

The RLC layer transmits data to an RLC layer of a reception side by using the functions of the MAC layer and the PHY layer. The RLC layer performs a delivery acknowledgment of data, and has retransmission control function. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a RRC connected state (connected state); otherwise, the UE 100 is in a RRC idle state (idle state).

A NAS (Non-Access Stratum) layer positioned above the RRC layer performs session management or mobility management, for example.

Figure 6:
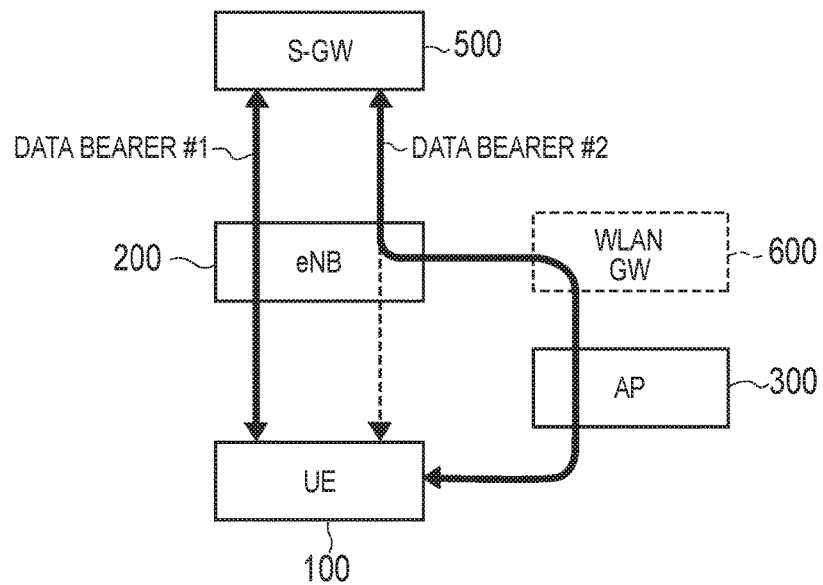
FIG. 6 is a diagram showing a communication control method according to the first embodiment.

FIG. 6 is a diagram showing a communication control method according to the first embodiment.

As shown in FIG. 6, in the first embodiment, the UE 100 has a radio connection with the eNB 200 and a radio connection with the AP 300. That is, the UE 100 simultaneously establishes the connection with the eNB 200 and that with the AP 300. That is, the UE 100 is allocated with a radio resource from each of the eNB 200 and the AP 300.

The eNB 200 maintains the RRC connection with the UE 100 having the radio connection with the eNB 200 and the radio connection with the AP 300. Thus, the eNB 200 is capable of performing various types of communication control on the UE 100.

In the first embodiment, the eNB 200 directly exchanges the data with the UE 100, and indirectly exchanges the data with the UE 100 via the AP 300 (and a WLAN GW 600). Specifically, between the UE 100 and the S-GW 500 (EPC 20), a data bearer #1 (first data bearer) that does not pass through the AP 300 but passes through the eNB 200, and a data bearer #2 (second data bearer) that passes through the AP 300 and the eNB 200, are established. The RRC layer of the eNB 200 manages the data bearer #1 and the data bearer #2.

Thus, the UE 100 establishes a plurality of data bearers via the eNB 200 and the AP 300. Further, the UE 100 is allocated with a radio resource from each of the eNB 200 and the AP 300. Therefore, it is possible to transmit a plurality of data (plurality of user data) in a parallel manner while securing a large communication capacity, and thus, it is possible to significantly improve throughput.

In the first embodiment, in the data bearer #2 between the eNB 200 and the AP 300, data is exchanged in an IP packet state. Alternatively, in the data bearer #2 between the eNB 200 and the AP 300, data is exchanged in a PDCP packet state where the data is capsuled in an IP packet. Further, the data bearer #2 may be split in two in the eNB 200. One of the split bearer is terminated at the UE 100 via the AP 300, and the other half is terminated at the UE 100 without passing through the AP 300.

It is noted that, in the first embodiment, the communication using the data bearer #1 shown in FIG. 6 is optional. That is, the communication system according to the first embodiment may be applicable if the communication using the data bearer #2 via at least the AP 300 is performed.

Figure 7:
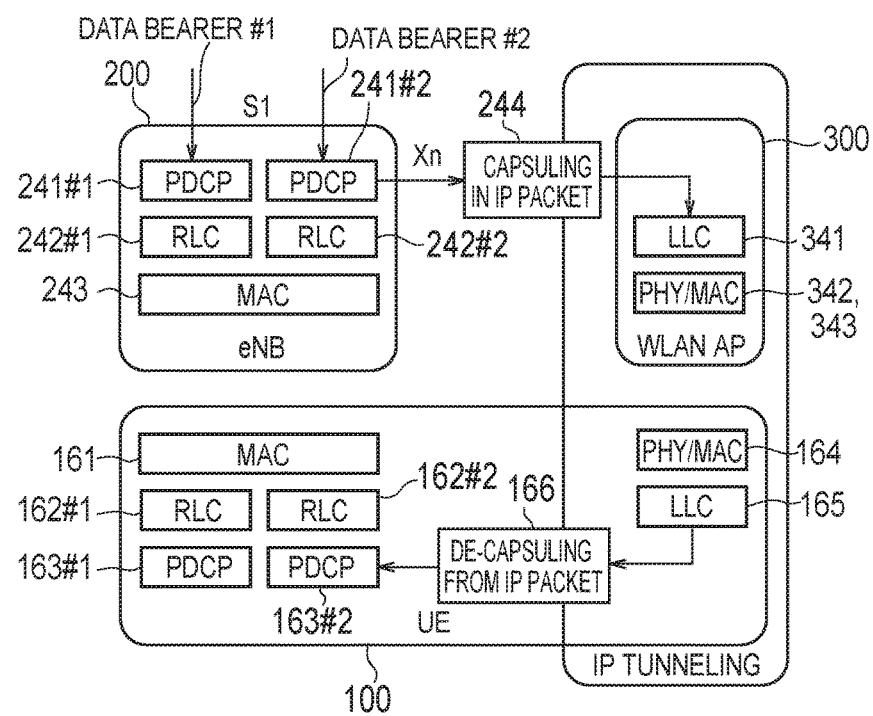
FIG. 7 is a diagram showing a data transmission scheme according to the first embodiment.

FIG. 7 is a diagram showing a data transmission scheme according to the first embodiment. In the data transmission scheme in the first embodiment, in the data bearer #2 between the eNB 200 and the AP 300, the data is exchanged in a PDCP packet state where the data is capsuled in an IP packet.

As shown in FIG. 7, the eNB 200 includes a PDCP entity 241#1 for the data bearer #1, a PDCP entity 241#2 for the data bearer #2, an RLC entity 242#1 for the data bearer #1, an RLC entity 242#2 for the data bearer #2, and an MAC entity 243. Further, a capsuling entity 244 (predetermined entity) shown in FIG. 7 is a function included either in the eNB 200 or the WLAN GW 600.

The AP 300 includes an LLC entity 341, an MAC LME entity 342, and a PHY LME entity 343.

The UE 100 may include an MAC entity 161, an RLC entity 162#1 for the data bearer #1, a PDCP entity 163#1 for the data bearer #1, an RLC entity 162#2 for the data bearer #2, a PDCP entity 163#2 for the data bearer #2, a PHY/MAC entity 164 of WLAN, an LLC entity 165, and a de-capsuling entity 166 (second entity).

The eNB 200 distributes, in the PDCP entity 241, the data belonging to the data bearer #2 (PDCP packet) to the RLC entity 242#2 and the capsuling entity 244. The data distributed to the RLC entity 242#2 is transmitted, through the RLC entity 242#2 and the MAC entity 243, to the UE 100. The UE 100 processes the data belonging to the data bearer #2 in the order of the MAC entity 161, the RLC entity 162#2, and the PDCP entity 163#2.

The data (PDCP packet) distributed to the capsuling entity 244 is capsuled by the capsuling entity 244 into an IP packet and forwarded to the AP 300. The AP 300 transmits the IP packet, through the LLC entity 341, the MAC LME entity 342, and the PHY LME entity 343, to the UE 100. The UE 100 processes the data belonging to the data bearer #2 in the order of the PHY/MAC entity 164, the LLC entity 165, and the de-capsuling entity 166 to de-capsule the IP packet so as to obtain the PDCP packet. The PDCP packet is reordered relative to the PDCP packet from the RLC entity 162#2 in the PDCP entity 163#2. Thus, an IP tunneling is set to between WLAN intervals by capsuling/de-capsuling the PDCP packet. Here, the PDCP is subjected to a security process such as encryption and authentication, and thus, an LTE-level security is realized in the communication at the WLAN side by passing the PDCP packet over to the WLAN side. Further, at the WLAN side, the security process such as encryption and authentication may be omitted.

On the other hand, the data belonging to the data bearer #1 is transmitted, through the PDCP entity 241#1, the RLC entity 242#1, and the MAC entity 243, to the UE 100. The UE 100 processes the data belonging to the data bearer #1 in the order of the MAC entity 161, the RLC entity 162#1, and the PDCP entity 163#1.

Next, an application scenario of the communication system according to the first embodiment will be described.

As shown in FIG. 7, the data (PDCP packet) transmitted from the eNB 200 via the AP 300 by using the data bearer #2 does not pass through the RLC entity 242 provided in the eNB 200. Thus, the data (PDCP packet) transmitted by using the data bearer #2 via the AP 300 is not subjected to delivery acknowledgment of the data performed by the RLC layer and re-transmission control based on the delivery acknowledgment. Therefore, in the first embodiment, with the following configuration, advanced communication control between the eNB 200 and the UE 100 performed via the AP 300 is enabled.

Figure 8:
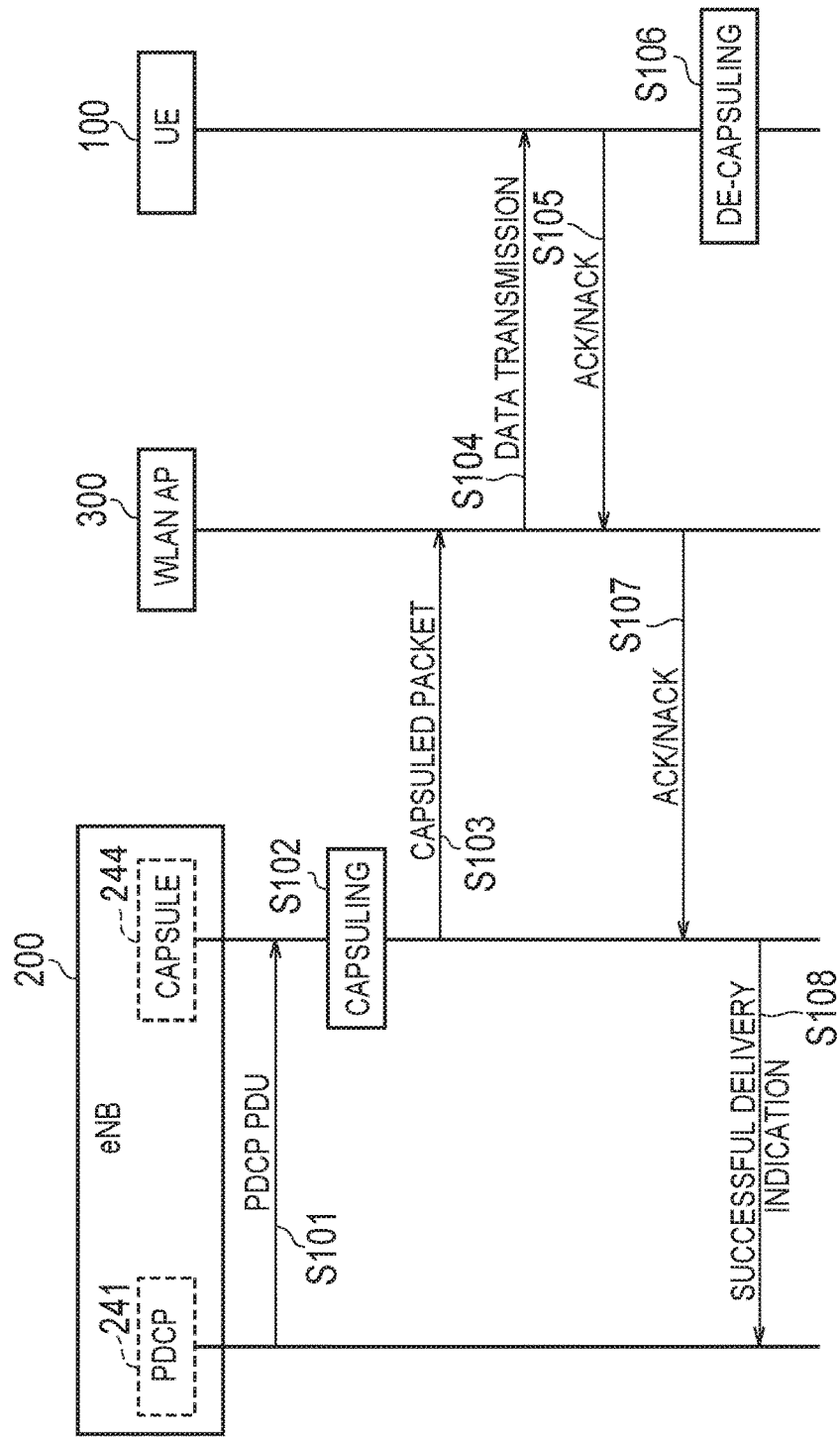
FIG. 8 is a sequence diagram between the eNB and the UE according to the first embodiment.

FIG. 8 is a sequence diagram between the eNB 200 and the UE 100 according to the first embodiment.

In step S101, the PDCP entity 241 of the eNB 200 outputs the data (PDCP packet) of the PDCP layer, to the capsuling entity 244 of the eNB 200.

In step S102, the capsuling entity 244 capsules the input PDCP packet in an IP layer.

In step S103, the capsuling entity 244 transmits the capsuled PDCP packet, that is, the IP packet, to the AP 300.

In step S104, the AP 300 transmits the IP packet to the UE 100.

In step S105, the de-capsuling entity 166 of the UE 100 transmits, on the basis of the received IP packet, delivery acknowledgement information (ACK/NACK) of the received data, to the AP 300.

In step S106, the de-capsuling entity 166 de-capsules the received IP packet.

In step S107, the AP 300 transmits the received delivery acknowledgement information to the eNB 200. The capsuling entity 244 of the eNB 200 accepts the delivery acknowledgement information.

In step S108, the capsuling entity 244 notifies, on the basis of the delivery acknowledgement information, the PDCP entity 241 of Successful delivery indication showing a state of the delivery acknowledgment of the PDCP packet.

Thus, in the communication that passes through the AP 300, it is possible to perform the data delivery acknowledgment between the capsuling entity 244 and the de-capsuling entity 166. Further, in other words, the capsuling entity 244 and the de-capsuling entity 166 operate as a virtual RLC entity such as an RLC entity of an AM (Acknowledge Mode).

It is noted that in the configuration of the communication system shown in FIG. 8, the WLAN GW 600 may be installed between the eNB 200 and the AP 300.

Figure 9:
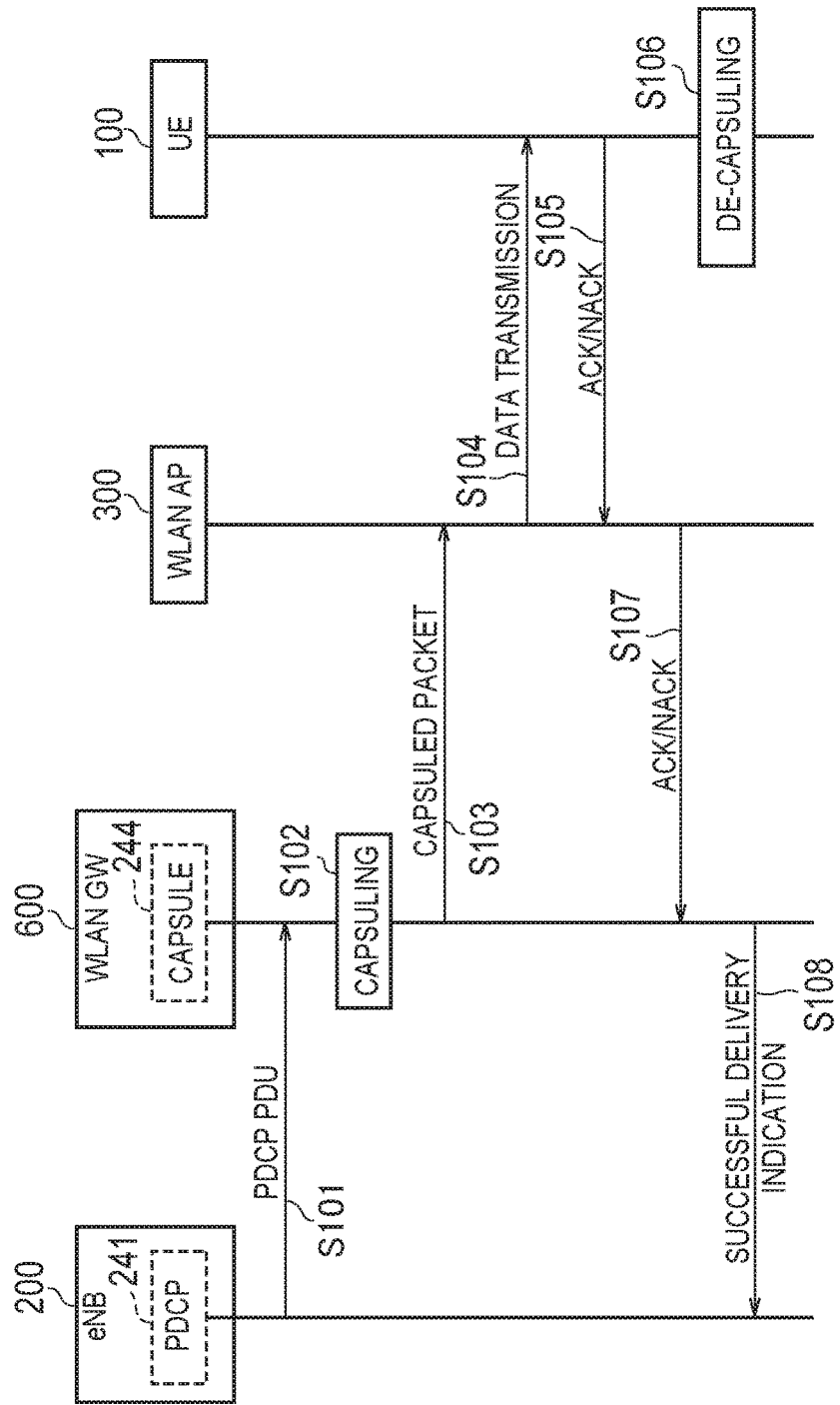
FIG. 9 is a sequence diagram between the eNB and the UE in another mode of the first embodiment.

FIG. 9 is a sequence diagram between the eNB 200 and the UE 100 in another mode according to the first embodiment. In the sequence diagram shown in FIG. 9, identical step numbers are allotted to the same operation shown in FIG. 8.

As shown in FIG. 9, another mode of the first embodiment is operated in much the same way as in FIG. 8 except for a feature that the WLAN GW 600 includes the capsuling entity 244.

As described above, on the basis of the communication system according to the first embodiment, it is possible to enable the advanced communication control, performed via the WLAN access point, between the cellular base station and the user terminal. Specifically, on the basis of the communication system according to the first embodiment, it is possible to perform an operation where a data reception side transmits the delivery acknowledgement information and a data transmission side performs the data delivery acknowledgment even when the eNB 200 and the UE 100 perform the communication via the AP 300. At this time, the capsuling entity 244 and the de-capsuling entity 166 operate as a virtual RLC entity.

Second Embodiment

Next, a communication system according to a second embodiment will be described. A network configuration and a functional block in the second embodiment are the same as the network configuration and the functional block diagram in the first embodiment shown in FIG. 1 to FIG. 7.

Figure 10:
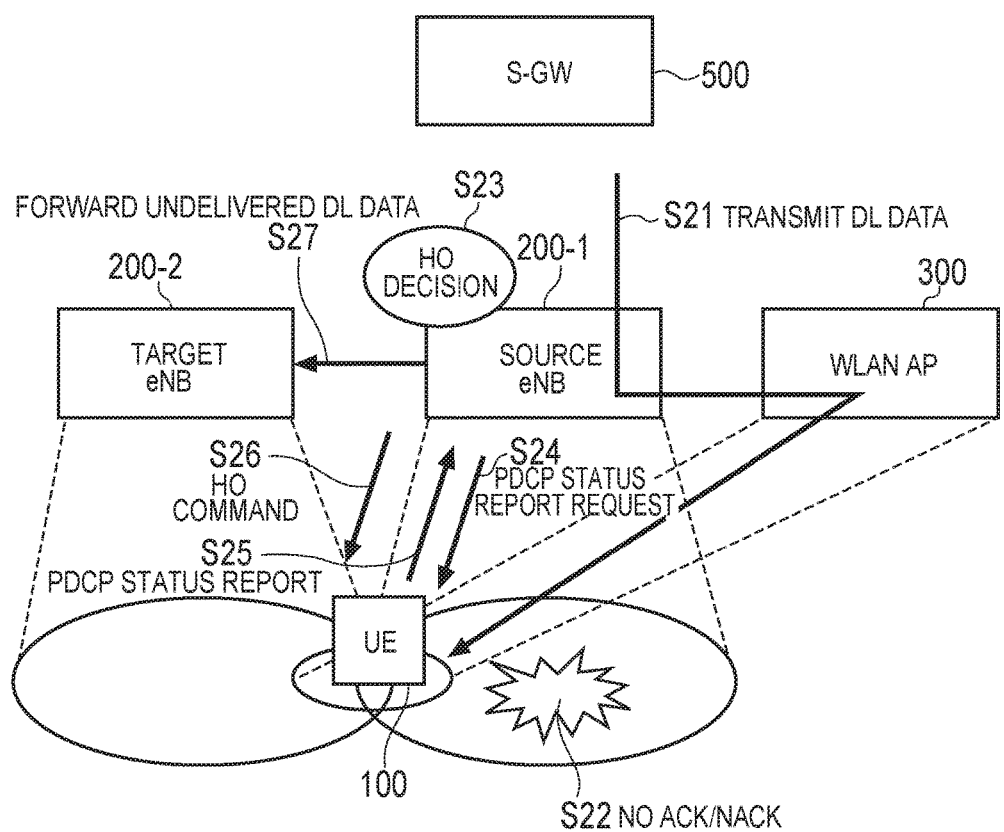
FIG. 10 is a diagram showing an operation overview of a communication system according to a second embodiment.

FIG. 10 is a diagram showing an operation overview of the communication system according to the second embodiment.

As shown in FIG. 10, the communication system according to the second embodiment is applied to a scenario where the UE 100 that receives downlink data via the AP 300 performs handover to a Target eNB 200-2 from a Source eNB 200-1.

In step S21, the Source eNB 200-1 transmits downlink (DL) data from the S-GW 500, via the AP 300, to the UE 100.

In step S22, the UE 100 does not respond delivery acknowledgement information (ACK/NACK) for the downlink data received via the AP 300. Thus, the Source eNB 200-1 is in a state of not being capable of confirming a delivery of the transmitted downlink data.

In step S23, the Source eNB 200-1 decides a handover (Handover (HO) decision).

Here, in a normal handover process, the Source eNB 200-1 forwards all the data where the delivery acknowledgment is yet to be performed, to the Target eNB 200-2 if the Source eNB 200-1 is unable to confirm the delivery of the downlink data transmitted to the UE 100. However, the Source eNB 200-1 forwards downlink data normally received by the UE 100, that is, data that does not require a forward, to the Target eNB 200-2, resulting in an increase in unnecessary traffic. Therefore, in the communication system according to the second embodiment, if the handover is performed, subsequent steps S24 and S25 are processed.

In step S24, the Source eNB 200-1 transmits a PDCP Status Report Request (delivery status report request) to the UE 100.

In step S25, the UE 100 transmits a PDCP Status Report (delivery status report) indicating a delivery status of the downlink data received by the UE 100, to the Source eNB 200-1. In the PDCP Status Report, an FMS (First Missing PDCP SN) indicating a sequence number (SN) of a PDCP SDU (Service Data Unit) that is unreceived in the PDCP entity 163 at a reception side (UE 100), and a bit map indicating whether or not the PDCP SDU after the FMS is already received by the PDCP entity at the reception side are included. It is noted that in the PDCP Status Report, information indicating a delivery status regarding the data received via the AP 300 and the data directly received from the Source eNB 200-1 is included.

In step S26, the Source eNB 200-1 transmits an HO Command (RRCConnectionReconfiguration) to the UE 100. Upon receipt of the HO Command, the UE 100 implements re-connection (re-establishment) in the PDCP layer.

In step S27, the Source eNB 200-1 forwards the downlink data that is undelivered at the reception side (UE 100) based on the PDCP Status Report received in step S25, to the Target eNB 200-2 to which the handover is made.

According to the above operation, in the communication system according to the second embodiment, if the handover is performed even when the downlink data communication via the AP 300 is performed, the Source eNB 200-1 is capable of forwarding only the undelivered data to the Target eNB 200-2.

Figure 11:
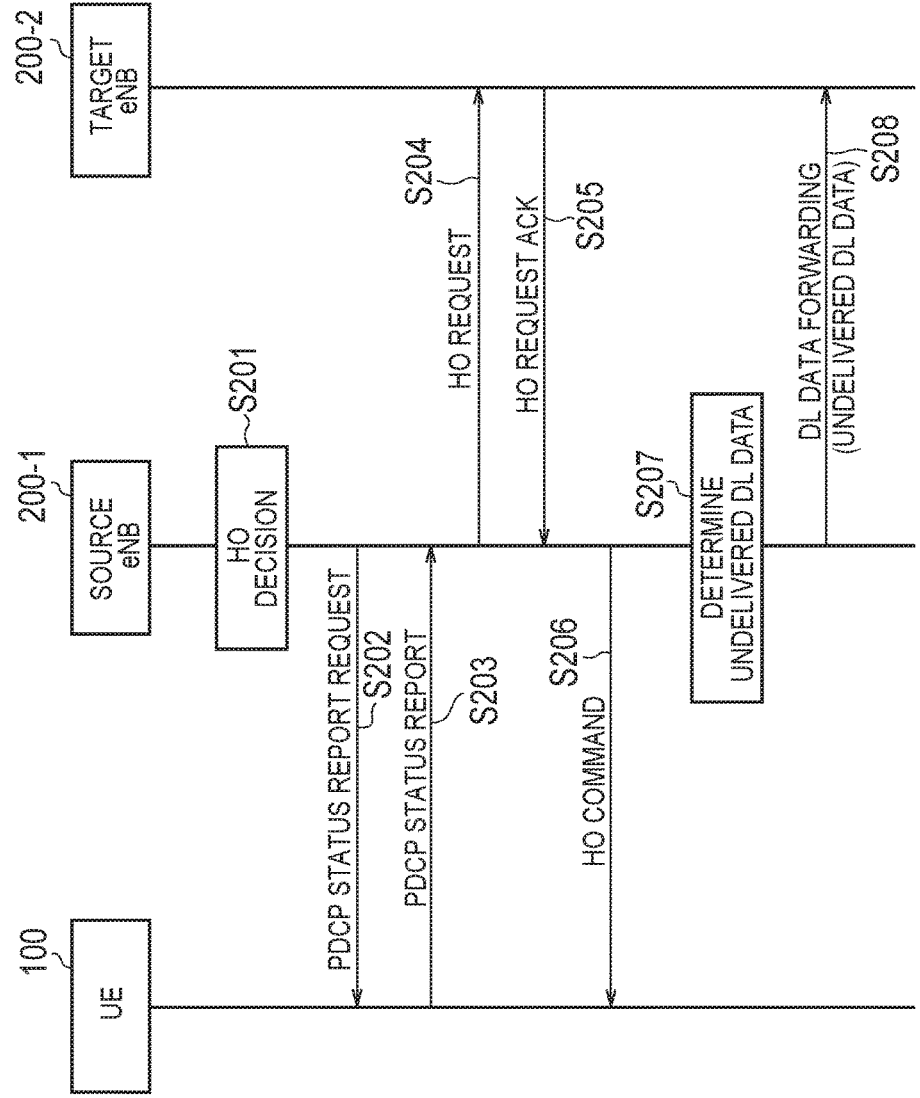
FIG. 11 is a sequence diagram in a communication system according to the second embodiment.

FIG. 11 is a sequence diagram in the communication system according to the second embodiment.

Step S201 shown in FIG. 11 corresponds to step S23 shown in FIG. 10. That is, before step S201, the processes prior to step S23 shown in FIG. 10 are implemented.

In step S201, the Source eNB 200-1 performs the HO decision.

In step S202, the Source eNB 200-1 transmits the PDCP Status Report Request to the UE 100.

In step S203, the UE 100 transmits, after receiving the PDCP Status Report Request, the PDCP Status Report indicating a delivery status of the downlink data received by the UE 100, to the Source eNB 200-1. As described above, in the PDCP Status Report, the information indicating the delivery status regarding the data received via the AP 300 and the data directly received from the Source eNB 200-1 is included.

In step S204, the Source eNB 200-1 transmits the HO Request to the Target eNB 200-2.

In step S205, the Target eNB 200-2 transmits the HO Request Ack to the Source eNB 200-1.

In step S206, the Source eNB 200-1 transmits the HO Command to the UE 100. Upon receipt of the HO Command (RRCConnectionReconfiguration), the UE 100 implements re-connection (re-establishment) in the PDCP layer.

In step S207, the Source eNB 200-1 determines, on the basis of the PDCP Status Report received in step S203, whether or not there is undelivered downlink data.

In step S208, the Source eNB 200-1 forwards the downlink data determined as undelivered in step S207, to the Target eNB 200-2.

It is noted that the processes in steps S202 and S203 may be performed after step S205.

It is noted that the processes in steps S202 and S203 may be executed if the re-connection (re-establishment) in the PDCP layer is implemented in the UE 100.

As described above, on the basis of the communication system according to the second embodiment, it is possible to enable the advanced communication control in the communication, performed via the WLAN access point, between the cellular base station and the user terminal. Specifically, according to the second embodiment, the Source eNB 200-1 is capable of receiving, if the handover is performed even if not being capable of obtaining (or not obtaining) the delivery acknowledgement information (ACK/NACK) from the reception side (UE 100), the delivery status report (PDCP Status Report) from the reception side. Then, the Source eNB 200-1, which is capable of forwarding, on the basis of the delivery status report, only the undelivered data to the Target eNB 200-2, is capable of preventing a traffic increase due to an unnecessary data forward.

Third Embodiment

Next, a communication system according to a third embodiment will be described. A network configuration and a functional block in the third embodiment are the same as the network configuration and the functional block diagram in the first embodiment shown in FIG. 1 to FIG. 7. Further, the second embodiment discusses the process based on the delivery status of the downlink data; the third embodiment will discuss a process based on a delivery status of uplink data.

Figure 12:
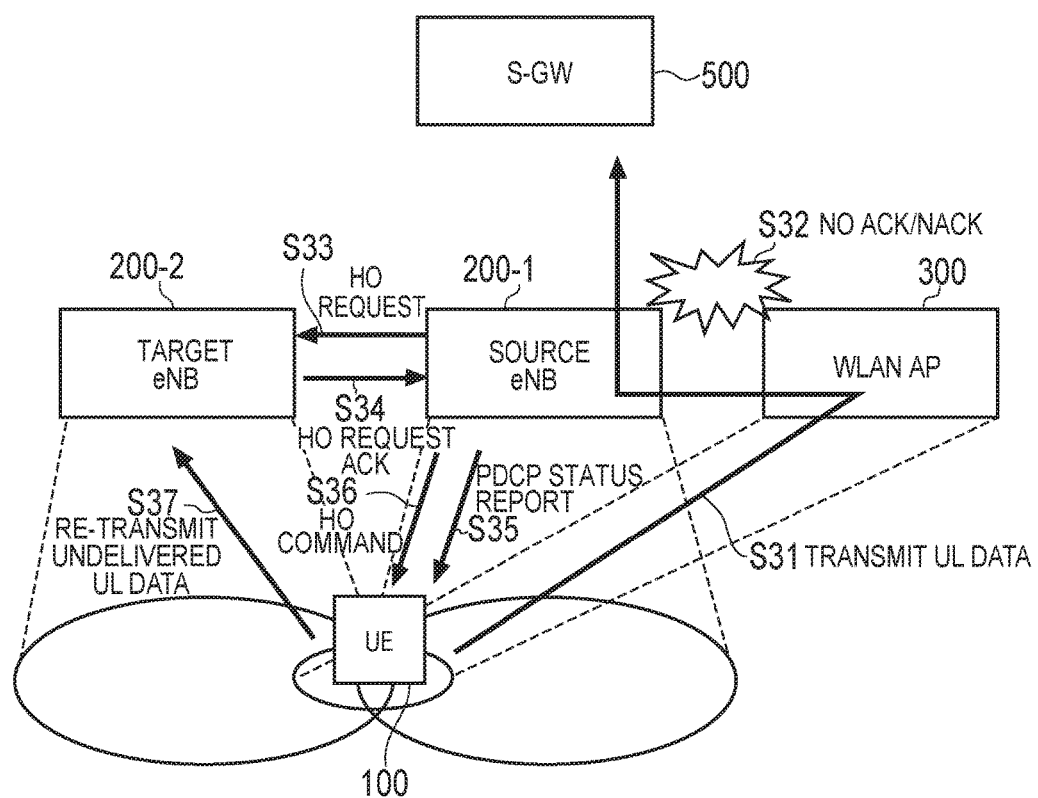
FIG. 12 is a diagram showing an operation overview of a communication system according to a third embodiment.

FIG. 12 is a diagram showing an operation overview of the communication system according to the third embodiment.

As shown in FIG. 12, the communication system according to the third embodiment is applied to a scenario where the UE 100 that transmits uplink data via the AP 300 performs handover to the Target eNB 200-2 from the Source eNB 200-1.

In step S31, the UE 100 transmits the uplink (UL) data, via the AP 300, to the Source eNB 200-1.

In step S32, the Source eNB 200-1 does not respond the delivery acknowledgement information (ACK/NACK) for the uplink data received via the AP 300. The UE 100 is in a state of not being capable of confirming a delivery of the transmitted uplink data.

In step S33, the Source eNB 200-1 transmits, after deciding the handover, an HO Request to the Target eNB 200-2.

In step S34, the Source eNB 200-1 receives an HO Request Ack sent from the Target eNB 200-2.

Here, in a normal handover process, if there is no confirming a delivery of the uplink data transmitted by the UE 100 after transmitting an HO Command from the Source eNB 200-1 to the UE 100, all the data where the delivery acknowledgment is yet to be performed are re-transmitted to the Target eNB 200-2. However, the UE 100 re-transmits the uplink data normally received by the Source eNB 200-1, that is, the data that does not require a forward, to the Target eNB 200-2, resulting in an increase in unnecessary traffic. Therefore, in the communication system according to the third embodiment, if the handover is performed, subsequent steps S35 and S36 are processed.

In step S35, the Source eNB 200-1 transmits a PDCP Status Report indicating a delivery status of the uplink data transmitted from the UE 100, to the UE 100. It is noted that in the PDCP Status Report, information indicating a delivery status regarding the data received via the AP 300 and the data directly received from the UE 100 is included.

In step S36, the Source eNB 200-1 transmits an HO Command to the UE 100. Upon receipt of the HO Command (RRCConnectionReconfiguration), the UE 100 implements re-connection (re-establishment) in the PDCP layer.

In step S37, the UE 100 re-transmits the uplink data that is undelivered at the reception side (Source eNB 200-1) based on the PDCP Status Report received in step S35, to the Target eNB 200-2 to which the handover is made.

According to the above operation, in the communication system according to the third embodiment, if the handover is performed even when the uplink data communication via the AP 300 is performed, the UE 100 is capable of re-transmitting only the undelivered data to the Target eNB 200-2.

Figure 13:
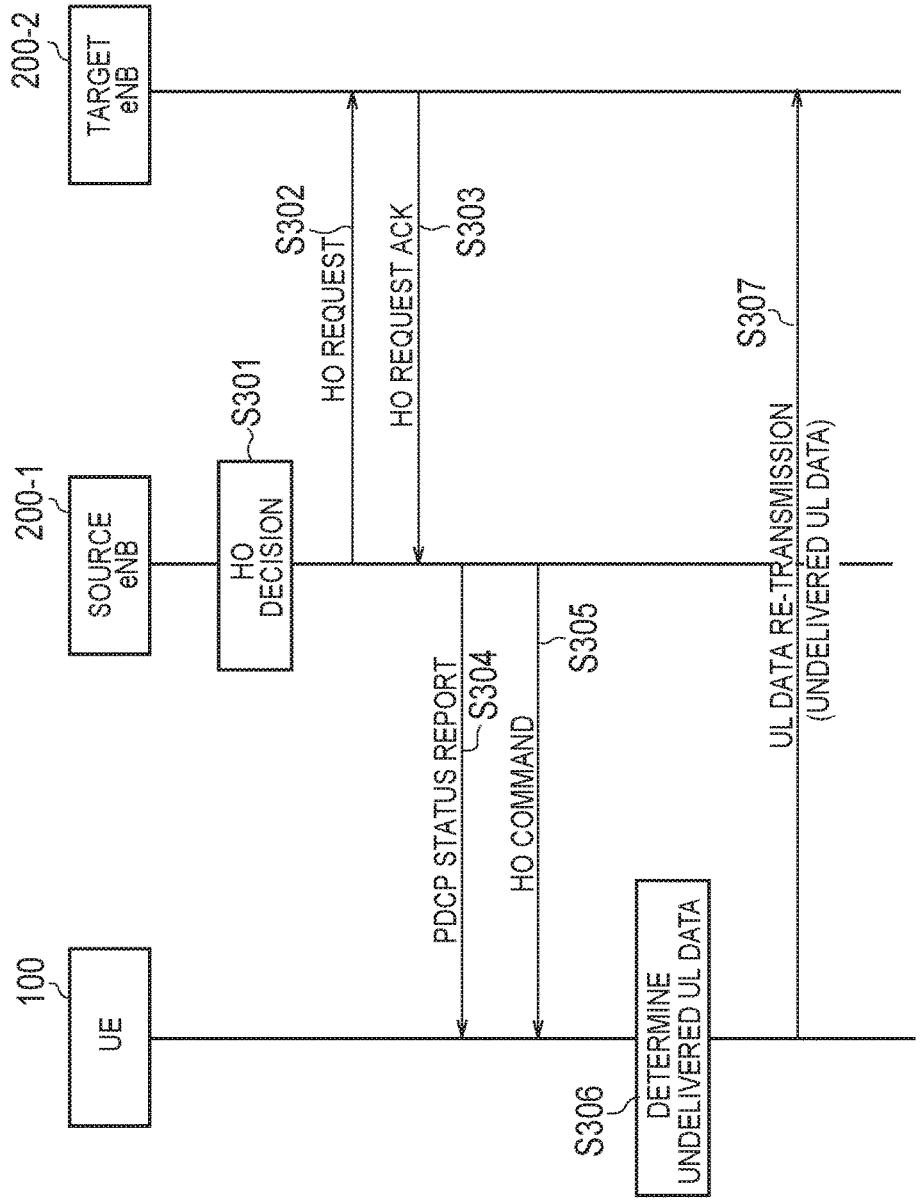
FIG. 13 is a sequence diagram in the communication system according to the third embodiment.

FIG. 13 is a sequence diagram in the communication system according to the third embodiment.

Step S302 shown in FIG. 13 corresponds to step S33 shown in FIG. 10. That is, before step S302, the processes prior to step S33 shown in FIG. 10 are implemented.

In step S301, the Source eNB 200-1 performs the HO decision.

In step S302, the Source eNB 200-1 transmits the HO Request to the Target eNB 200-2.

In step S303, the Target eNB 200-2 transmits the HO Request Ack to the Source eNB 200-1.

In step S304, the Source eNB 200-1 transmits the PDCP Status Report indicating a delivery status of the uplink data received by the Source eNB 200-1, to the UE 100. As described above, in the PDCP Status Report, information indicating a delivery status regarding the data received via the AP 300 and the data directly received from the UE 100 is included.

In step S305, the Source eNB 200-1 transmits the HO Command to the UE 100. Upon receipt of the HO Command (RRCConnectionReconfiguration), the UE 100 implements re-connection (re-establishment) in the PDCP layer.

In step S306, the UE 100 determines, on the basis of the PDCP Status Report received in step S304, whether or not there is the undelivered uplink data.

In step S307, the Source eNB 200-1 re-transmits the uplink data determined as undelivered in step S307, to the Target eNB 200-2 (UL Data re-transmission).

It is noted that the process in step S304 may be executed if the re-connection (re-establishment) in the PDCP layer is implemented in the UE 100.

As described above, on the basis of the communication system according to the third embodiment, it is possible to enable the advanced communication control in the communication, performed via the WLAN access point, between the cellular base station and the user terminal Specifically, according to the third embodiment, the UE 100 is capable of receiving, if the handover is performed even if not being capable of obtaining (or not obtaining) the delivery acknowledgement information (ACK/NACK) from the reception side (Source eNB 200-1), the delivery status report (PDCP Status Report) from the reception side. Then, the UE 100, which is capable of forwarding, on the basis of the delivery status report, only the undelivered data to the Target eNB 200-2, is capable of preventing a traffic increase due to an unnecessary data forward.

It is noted that it is possible to simultaneously apply the communication system in the second embodiment and the communication system in the third embodiment.

Other Embodiments

In the above-described first embodiment, an example with the PDCP packet is described; this is not limiting. Instead of the PDCP packet, a GTP-U packet may be used. That is, the capsuling entity 166 and the capsuling entity 244 may have a function as the GTP-U entity.

In each of the above-described embodiments, the delivery acknowledgement information report is performed triggered by the handover; this is not limiting, and the delivery acknowledgement information report may be performed triggered by a predetermined layer reconfiguration request (RRC connection reconfiguration) that does not include the handover request.

In each of the above-described embodiments, as one example of the cellular communication system, the LTE system is described; however, not only the LTE system but also a cellular communication system other than the LTE system may be applied.

It is noted that the entire content of Japanese Patent Application No. 2014-097178 (filed on May 8, 2014) is incorporated in the present specification by reference.

INDUSTRIAL APPLICABILITY

As described above, according to the communication control method according to the present embodiment is capable of performing advanced communication control in communication between a cellular base station and a user terminal performed via the WLAN access point, and thus, useful in a mobile communication field.

The invention claimed is:

1. A communication control method, comprising:
controlling, by a cellular base station, communication with a user terminal by use of a first data bearer and a second data bearer, the first data bearer not passing through a Wireless Local Area Network (WLAN) but passing through the cellular base station, and the second data bearer passing the WLAN and the cellular base station;
transmitting, by the user terminal, a status report indicating a delivery status regarding data received via the WLAN and data directly received from the cellular base station, to the cellular base station; and
receiving, by the cellular base station, the status report from the user terminal, wherein
the status report includes information on a sequence number of first missing Packet Data Convergence Protocol Service Data Unit (PDCP SDU).

2. The communication control method according to claim 1, wherein
the status report further includes information indicating whether or not a PDCP SDU after the first missing PDCP SDU is already received.

3. The communication control method according to claim 1, comprising
reordering, by the user terminal, a PDCP packet received as data in a PDCP entity.

4. The communication control method according to claim 1, comprising:
transmitting, by the cellular base station, information to transmit the status report, to the user terminal; and
transmitting, by the user terminal, the status report based on the information transmitted from the cellular base station, to the cellular base station.

5. A user terminal comprising:
a processor; and
a memory communicatively coupled to the processor, wherein
the processor is configured to:
control communication with a cellular base station by use of a first data bearer and a second data bearer, the first data bearer not passing through a Wireless Local Area Network (WLAN) but passing through the cellular base station, and the second data bearer passing the WLAN and the cellular base station; and
transmit a status report indicating a delivery status regarding data received via the WLAN and data directly received from the cellular base station, to the cellular base station, and
the status report includes information on a sequence number of first missing Packet Data Convergence Protocol Service Data Unit (PDCP SDU).

6. A processor for controlling a user terminal, the processor communicatively coupled to a memory and configured to:
control communication with a cellular base station by use of a first data bearer and a second data bearer, the first data bearer not passing through a Wireless Local Area Network (WLAN) but passing through the cellular base station, and the second data bearer passing the WLAN and the cellular base station; and
transmit a status report indicating a delivery status regarding data received via the WLAN and data directly received from the cellular base station, to the cellular base station, and
the status report includes information on a sequence number of first missing Packet Data Convergence Protocol Service Data Unit (PDCP SDU).

* * * * *